(12) United States Patent
Yang et al.

(10) Patent No.: US 11,172,548 B2
(45) Date of Patent: Nov. 9, 2021

(54) COOKING APPARATUS FOR COOKING PACKAGED INGREDIENTS

(71) Applicant: Food Industry Research and Development Institute, Hsinchu (TW)

(72) Inventors: Binghuei-Barry Yang, Chiayi (TW); Feng-Chi Liu, Tainan (TW); Pei-Wen Lo, Tainan (TW); Yao-Te Tsai, Tainan (TW); Yu-Chi Cheng, Tainan (TW)

(73) Assignee: Food Industry Research and Development Institute

( * ) Notice: Subject to any disclaimer, the term of this patent is extended or adjusted under 35 U.S.C. 154(b) by 598 days.

(21) Appl. No.: 16/122,140

(22) Filed: Sep. 5, 2018

(65) Prior Publication Data

US 2019/0215916 A1    Jul. 11, 2019

(30) Foreign Application Priority Data

Jan. 10, 2018 (TW) .................................. 107100938

(51) Int. Cl.
| | |
|---|---|
| *H05B 6/64* | (2006.01) |
| *A47J 27/00* | (2006.01) |
| *A23L 5/10* | (2016.01) |
| *F24C 7/08* | (2006.01) |
| *B65D 81/34* | (2006.01) |
| *H04N 21/47* | (2011.01) |

(52) U.S. Cl.
CPC .............. *H05B 6/6441* (2013.01); *A23L 5/10* (2016.08); *A47J 27/004* (2013.01); *H05B 6/6473* (2013.01); *A23L 5/15* (2016.08); *B65D 81/3446* (2013.01); *F24C 7/082* (2013.01); *H04N 21/47* (2013.01)

(58) Field of Classification Search
CPC .. H05B 1/0261; H05B 6/6441; H05B 6/6473; H05B 1/02; A23L 5/10; A23L 5/15; A47J 27/004; F24C 7/082; H02N 21/47
USPC ........ 219/490, 494, 506, 479, 702, 716, 714
See application file for complete search history.

(56) References Cited

U.S. PATENT DOCUMENTS

| | | | | |
|---|---|---|---|---|
| 10,009,957 | B2* | 6/2018 | Pereira ................. | G05B 19/042 |
| 10,154,749 | B2* | 12/2018 | Riefenstein ............ | F24C 7/085 |
| 10,716,174 | B2* | 7/2020 | Matsui ................... | H05B 6/687 |
| 10,939,508 | B2* | 3/2021 | Imai ...................... | H05B 6/6447 |
| 2006/0289508 | A1* | 12/2006 | Kim ...................... | H05B 6/6441 |
| | | | | 219/714 |
| 2007/0007279 | A1* | 1/2007 | Chun .................... | H05B 6/6441 |
| | | | | 219/506 |

(Continued)

*Primary Examiner* — Phuong T Nguyen
*Assistant Examiner* — Yeong Juen Thong
(74) *Attorney, Agent, or Firm* — Fish & Richardson P.C.

(57) ABSTRACT

A cooking apparatus for cooking ingredients packaged together in a package is provided. The cooking apparatus includes a cooking device and a barcode reader. The cooking device includes a housing defining a cooking room for accommodating the ingredients therein, a cooking unit for heating contents in the cooking room, and a control module electrically connected to the cooking unit for controlling operation of the cooking unit. The barcode reader is electrically connected to the control module, and scans a barcode on the package representing data related to information about the ingredients, decodes the barcode so as to obtain the data, and transmits the data to the control module that controls operation of the cooking unit based on the information.

19 Claims, 3 Drawing Sheets

(56) References Cited

U.S. PATENT DOCUMENTS

| | | | |
|---|---|---|---|
| 2013/0306626 A1* | 11/2013 | Torres | B65D 81/3446 |
| | | | 219/635 |
| 2014/0231418 A1* | 8/2014 | Ikeda | H05B 6/645 |
| | | | 219/705 |
| 2015/0289324 A1* | 10/2015 | Rober | H05B 6/68 |
| | | | 219/711 |

* cited by examiner

COOKING APPARATUS FOR COOKING PACKAGED INGREDIENTS

CROSS-REFERENCE TO RELATED APPLICATION

This application claims priority to Taiwanese Patent Application No. 107100938, filed on Jan. 10, 2018.

FIELD

This disclosure relates to a cooking apparatus, more particularly to a cooking apparatus capable of automatically cooking food.

BACKGROUND

Food safety has gained increasing attention in recent years. As a result, more and more people tend to cook by themselves at home. Since a conventional cooking apparatus (e.g., a gas stove, a microwave oven, an induction cooker, an oven, etc.) typically has only one cooking function (i.e., a single heating manner), a user who wishes to cook in multiple different ways may need a lot of room for placing two or more cooking apparatuses. Even though some composite cooking apparatuses provide multiple cooking functions, it is relatively difficult for a user having little experience in cooking food to cook properly using such composite cooking apparatuses.

SUMMARY

Therefore, the present disclosure is to provide a cooking apparatus capable of automatically cooking food and adjusting operation condition and operation time duration for cooking food.

According to this disclosure, a cooking apparatus is provided. The cooking apparatus is configured to cook ingredients packaged together in a package. The package is provided with a barcode representing data related to information about the ingredients. The cooking apparatus includes a cooking device and a barcode reader. The cooking device includes a housing, a cooking unit and a control unit. The housing defines a cooking room for accommodating the ingredients therein. The cooking unit is configured to heat contents in the cooking room. The control module is electrically connected to the cooking unit for controlling operation of the cooking unit. The barcode reader is electrically connected to the control module, and is configured to scan the barcode on the package. The barcode reader is further configured to decode the barcode so as to obtain the data represented by the barcode, and to transmit the data to the control module. The control module controls operation of the cooking unit based on the information contained in the data received from the barcode reader.

BRIEF DESCRIPTION OF THE DRAWINGS

Other features and advantages of the present disclosure will become apparent in the following detailed description of the embodiments of the disclosure, with reference to the accompanying drawings, in which.

DETAILED DESCRIPTION

Figure 1:
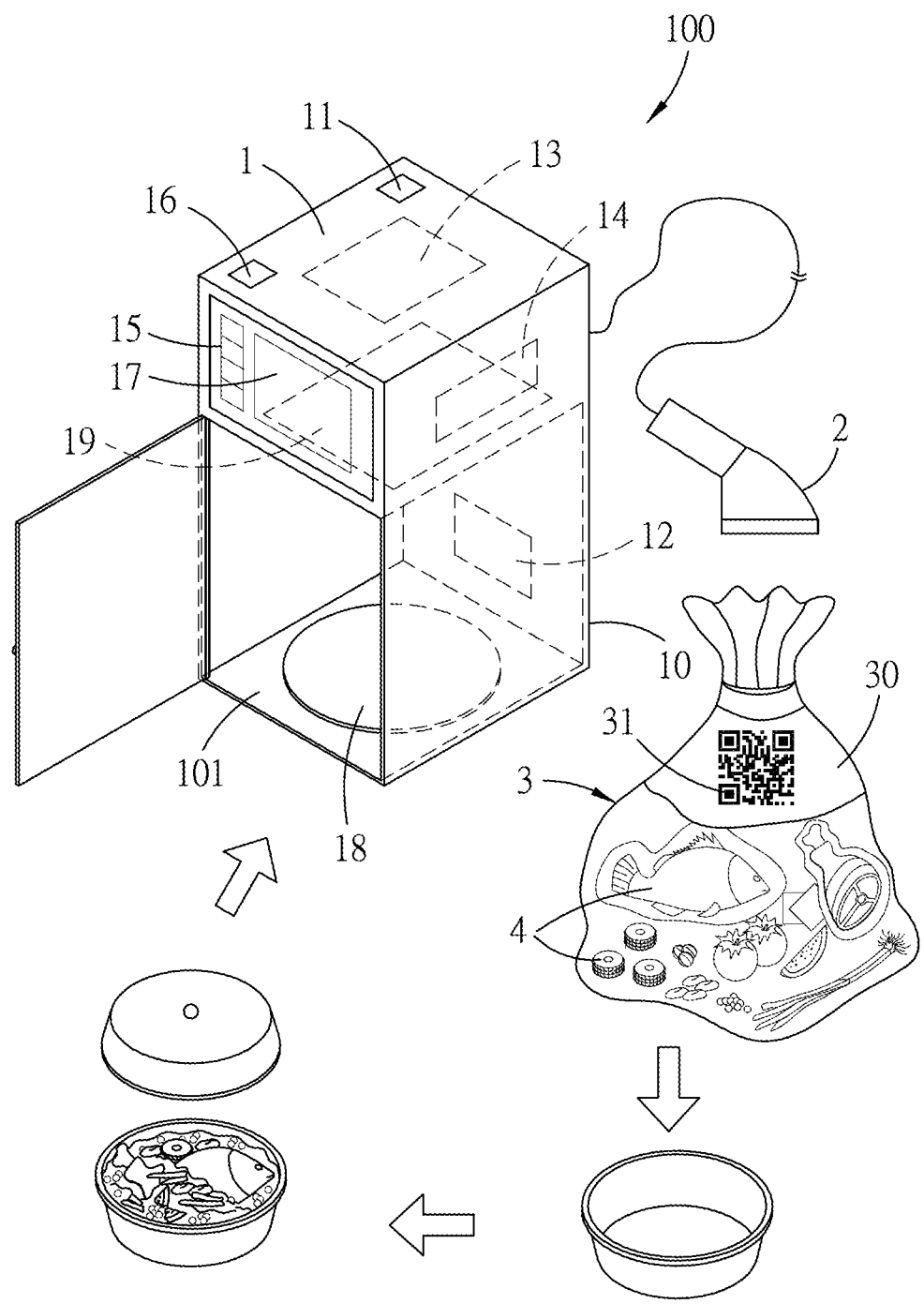
FIG. 1 is a schematic diagram illustrating a cooking apparatus according to an embodiment of the present disclosure and a package of ingredients.
Figure 2:
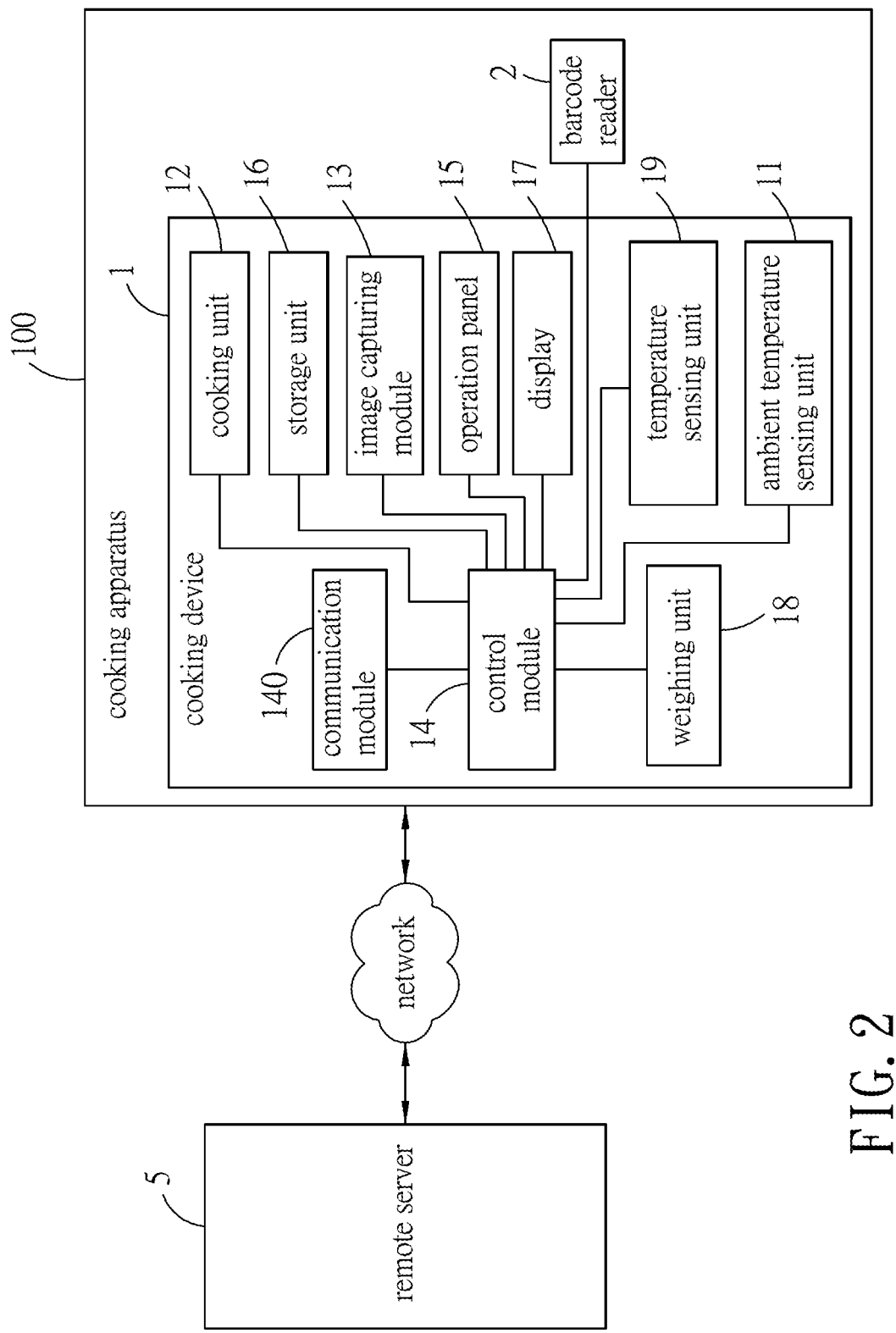
FIG. 2 is a block diagram of the cooking apparatus according to one embodiment of the present disclosure.

Referring to FIGS. 1 and 2, a cooking apparatus 100 according to one embodiment of the present disclosure is shown. The cooking apparatus 100 is configured to cook ingredients 4 originally packaged together in a package 3. The package 3 is provided with a barcode 31, e.g., on an outer surface 30 thereof. The barcode 31 represents data related to information about the ingredients 4. The barcode 31 is a two-dimensional barcode, e.g., a quick response code (QR code) in this embodiment, and can be any other barcode such as a GSI barcode in other embodiments.

The cooking apparatus 100 includes a cooking device 1 and a barcode reader 2. The cooking device 1 includes a housing 10, a cooking unit 12 and a control module 14. The housing 10 defines a cooking room 101 for accommodating the ingredients 4 therein. The cooking unit 12 is electrically connected to the control module 14, and is configured to operate in a plurality of operation modes as controlled by the control module 14 to heat contents in the cooking room 101. The position of the cooking unit 12 depicted in FIG. 1 is illustrated as an example, and the cooking unit 12 can be mounted to any position inside the housing 10 as required. In one embodiment, the cooking device 1 further includes an operation panel 15 electrically connected to the control module 14 and accessible by a user. The user may operate the operation panel 15 to select one of the operation modes in which the cooking unit 12 operates for heating the contents in the cooking room 101, and to adjust one or both of operating condition and an operation time duration for the selected one of the operation modes. The operating condition is, e.g., a heating power level of the cooking unit 12. Note that the cooking unit 12 may include various heating devices mounted at suitable positions in the cooking room 101 for implementing the operation modes that include, e.g., microwaving, grilling, steaming, baking, etc., and the present disclosure is not limited in this respect. Since the feature of this disclosure does not reside in the configuration of the cooking unit 12, further details of the same are omitted hereinafter for the sake of brevity.

The control module 14 is configured to automatically control operation of the cooking unit 12 such as selecting one of the operation modes and adjusting the operating condition and/or the operation time duration for the selected one of the operation modes. The term "control module" may refer to any device or portion of a device that processes electronic data from registers and/or memory to transform that electronic data into other electronic data. For example, the control module 14 may include, but not limited to, a single core processor, a multi-core processor, a dual-core mobile processor, a microprocessor, a microcontroller, a digital signal processor (DSP), a field-programmable gate array (FPGA) an application specific integrated circuit (ASIC), a radio-frequency integrated circuit (RFIC), etc.

The barcode reader 2 is electrically connected to the control module 14, and is configured to scan the barcode 31 on the package 3, to decode the barcode 31 so as to obtain the data represented by the barcode 31, and to transmit the data to the control module 14. In one embodiment, upon receipt of the data represented by the barcode 31, the control module 14 controls operation of the cooking unit 12 based on the information contained in the data received from the barcode reader 2. The control module 14 is programmed to execute a cooking program for cooking the ingredients 4 where the control module 14 automatically selects and schedules at least two of the operation modes and automatically adjusts the operating condition and/or the operation time duration for a currently-executed one of the at least two operation modes. In one embodiment, the data represented by the barcode 31 includes instructions related to the cooking program for cooking the ingredients 4, and the control module 14 is programmed to execute the instructions for implementing the cooking program. For example, to cook the ingredients 4 originally packaged together in the package 3, the ingredients 4 are first put in a container such as a bowl (see FIG. 1) to be placed in the cooking room 101, and then a door of the housing 10 is closed after the bowl is placed in the cooking room 101. Next, the barcode reader 2 is operated by a user to scan the barcode 31 on the package 3, and then the barcode reader decodes the barcode 31 and transmits the data represented by the barcode 31 to the control module 14. The user then presses a button, e.g. a start button, of the operation panel 15 to activate the control module 14 to automatically control operation of the cooking unit 12 according to the cooking program. Note that the information contained in the data represented by the barcode 31 may include, without limitation, image features that are related respectively to the ingredients 4, a predetermined location where the ingredients 4 is supposed to be placed inside the cooking room 101, names respectively of the ingredients 4, and an amount (e.g., a predetermined total weight) of the ingredients 4.

In one embodiment, the cooking device 1 further includes an image capturing module 13 and a display 17 that are electrically connected to the control module 14. The image capturing module 13 is a camera configured to capture an image inside the cooking room 101 and to transmit the image to the control module 14. For example, the image capturing module 13 captures the image inside the cooking room 101 when the control module 14 determines that the door of the housing 10 is closed and the data related to the information about the ingredients 4 is received from the barcode reader 2. The control module 14 further analyzes the image received from the image capturing module 13 to determine whether the cooking room 101 has placed therein the ingredients 4 corresponding to the information. Specifically, the control module 14 analyzes the image to determine whether the image received from the image capturing module 13 has the image features that are included in the information contained in the data represented by the barcode 31. When the image has all the image features included in the information, the control module 14 determines that the cooking room 101 has all the ingredients 4 placed therein, and activates and controls operation of the cooking unit 12 to heat the contents in the cooking room 101 according to the cooking program. When the image does not have all the image features, the control module 14 determines that the cooking room 101 does not have all the ingredients 4 placed therein, and outputs a notification/alert such as a voice message or to control the display 17 to display a result of the determination to notify the user of the result of the determination. It should be noted that the operation panel 15 can be integrated with the display as a touch screen in some embodiments of this disclosure.

In some embodiments, the cooking device 1 further includes a storage unit 16 that is electrically connected to the control module 14, and that stores a plurality of reference image features that are related respectively to a plurality of ingredient items. In such case, the control module 14 accesses the storage unit 16 to acquire corresponding ones of the reference image features of the ingredient items that correspond respectively to the ingredients 4 based on the names of the ingredients 4 included in the information. Then, the control module 14 analyzes the image received from the image capturing module 13, and determines whether the image has the corresponding ones of the reference image features that are acquired from the storage unit 16. The control module 14 determines that the cooking room 101 has all the ingredients 4 placed therein when the image has all the corresponding ones of the reference image features, and determines that the cooking room 101 does not have all the ingredients 4 placed therein when otherwise.

In one embodiment, upon determining that the cooking room 101 has the ingredients 4 placed therein, the control module 14 further analyzes the image received from the image capturing module 13 to further determine whether the ingredients 4 are placed at the predetermined location in the cooking room 101 based on the information contained in the data represented by the barcode 31. In some embodiments, the control module 14 compares the image received from the image capturing module 13 with a pre-stored image that indicates the predetermined location to determine whether the ingredients 4 are placed at the predetermined location. The control module 14 activates and controls operation of the cooking unit 12 to heat the contents in the cooking room 101 based on the information contained in the data when determining that the cooking room 101 has all the ingredients 4 placed therein and that the ingredients 4 are placed at the predetermined location. When determining that the ingredients 4 are not placed at the predetermined location, the control module 14 outputs a notification to notify the user of the result of the determination by, for example, controlling the display 17 to display the notification.

In one embodiment, the cooking device 1 further includes a weighing unit 18 (e.g., an electric weight scale) electrically connected to the control module 14. The weighing unit 18 is mounted at a bottom of the housing 10, and is configured to weigh the contents in the cooking room 101 and to transmit a weight of the contents to the control module 14. Upon determining that the cooking room 101 has the ingredients 4 placed therein and at the predetermined location, the control module 14 further determines whether the weight of the contents in the cooking room 101 conforms with the predetermined total weight of the ingredients 4 based on the information. The control module 14 further controls the display 17 to display a result of the determination, and activates and controls operation of the cooking unit 12 according to the cooking program when determining that the cooking room 101 has all the ingredients 4 placed therein, that the ingredients 4 are placed at the predetermined location, and that the weight of the contents in the cooking room 101 is equal to the predetermined total weight. Similarly, when the weight of the contents in the cooking room 101 is not equal to the predetermined total weight, the control module 14 further outputs a notification such as a voice message to notify the user of the result of the determination.

In some embodiments, the control module 14 activates and controls operation of the cooking unit 12 according to the cooking program when determining that the cooking room 101 has all the ingredients 4 placed therein and that the weight of the contents in the cooking room 101 is equal to the predetermined total weight. In some embodiments, the control module 14 does not activate the cooking unit 12 when determining that the cooking room 101 does not have all the ingredients 4 placed therein, that the ingredients 4 are not placed at the predetermined location, or that the weight of the contents in the cooking room 101 is not equal to the predetermined total weight.

In one embodiment, the cooking device 1 further includes a temperature sensing unit 19 electrically connected to the control module 14 and disposed in the cooking room 101. The temperature sensing unit 19 is configured to sense an inside temperature in the cooking room 101 and to transmit the inside temperature to the control module 14. The control module 14 is further configured to adjust the operating condition and/or the operation time duration of the operation of the cooking unit 12 to heat the contents in the cooking room 101 based on the inside temperature sensed by the temperature sensing unit 19 during running of the cooking program. In one embodiment, the temperature sensing unit 19 is further configured to sense a plurality of regional temperatures corresponding respectively in position to a plurality of regions in the cooking room 101, and to transmit the regional temperatures to the control module 14. The control module 14 is further configured to compare the regional temperatures respectively with a plurality of predetermined temperatures, e.g., stored in the storage unit 16 or included in the information contained in the data represented by the barcode 31, and to determine whether to adjust the operating condition or the operation time duration for the cooking unit 12 based on a result of the comparison between the regional temperatures and the predetermined temperatures. In this embodiment, the temperature sensing unit 19 is an infrared camera or a thermographic camera mounted at a top of the housing 10, and is configured to divide a bottom surface of the housing 10 into a 3-by-3 grid with nine rectangular regions, and to sense the regional temperatures respectively of the rectangular regions. It should be noted that the regional temperatures may be considered as surface temperatures of the ingredients 4 that are received in the bowl, and the control module 14 is configured to determine whether the ingredients 4 are overheated and whether the ingredients are heated unevenly based on the surface temperatures. In other embodiments, the temperature sensing unit 19 is an electronic thermometer, a pyrometer, or an infrared thermometer, etc.

In one embodiment, the control module 14 adjusts the operating condition by increasing the heating power level and/or increases the operation time duration for heating, for example, one of the regions in the cooking room 101 when determining that one of the surface temperatures of the ingredients 4 corresponding in position to said one of the regions is lower than the respective predetermined temperature. On the contrary, the control module 14 decreases the heating power level and/or the operation time duration for heating another one of the regions in the cooking room 101 when determining that one of the surface temperatures of the ingredients 4 corresponding in position to the another one of the regions exceeds the respective predetermined temperature. The control module 14 continuously adjusts the operating condition and/or the operating time duration of the cooking unit 12 until the result of the comparison indicates that all of the regional temperatures sensed by the temperature sensing unit 19 conform respectively with the predetermined temperatures.

In one embodiment, the control module 14 is further configured to determine a degree of degradation of the cooking unit 12 based on the result of the comparison between the regional temperatures sensed by the temperature sensing unit 19 and the predetermined temperatures and to determine whether to adjust the operating condition or the operation time duration for the cooking unit 12 based on the degree of degradation of the cooking unit 12. In some embodiments, the control module 14 determines that the cooking unit 12 is degraded when a difference between the regional temperatures sensed by the temperature sensing unit 19 and the predetermined temperatures is greater than a predetermined value. For example, the control module 14 determines the degree of degradation of the cooking unit 12 as a parameter positively correlated to the difference between the regional temperatures and the predetermined temperatures when the regional temperatures sensed by the temperature sensing unit 19 are lower than the predetermined temperatures. In some embodiments, the control module 14 adjusts the operating condition by increasing the heating power level and/or increases the operating time duration of the cooking unit 12 when the degree of degradation is relatively large.

In one embodiment, the control module 14 is further configured to determine the degree of degradation of the cooking unit 12 by comparing an actual output power of the cooking unit 12 with a predetermined output power of the cooking unit 12. It should be noted that the predetermined output power of the cooking unit 12 is a rated output power. The control module 14 is configured to determine whether to adjust the operating condition or the operation time duration of the operation of the cooking unit 12 to heat the contents in the cooking room 101 based on the degree of degradation of the cooking unit 12. For example, the control module 14 obtains the actual output power that is obtained from one of, without limitation, a voltmeter, a galvanometer, etc., determines the degree of degradation of the cooking unit 12 based on a difference between the actual output power and the predetermined output power, and then determines whether to adjust the operating condition or the operation time duration of the cooking unit 12. For example, the control module 14 determines the degree of degradation of the cooking unit 12 as a parameter positively correlated to the difference between the actual output power and the predetermined output power. When the degree of degradation of the cooking unit 12 is relatively large, the control module 14 adjusts the operating condition by increasing the heating power level and/or increases the operating time duration of the cooking unit 12.

In some embodiments, the control module 14 first adjusts the operating condition and/or the operating time duration when the regional temperatures are lower than the predetermined temperatures or the actual output power is different from the predetermined output power, and further determines that the cooking unit 12 is degraded when the adjustment is ineffective.

Note that, when the degree of degradation of the cooking unit 12 reaches a predetermined degree, the control module 14 further controls the display unit 17 to display the degree of degradation of the cooking unit 12 to notify the user that the cooking unit 12 requires replacement (or maintenance).

In one embodiment, the cooking device 1 further includes an ambient temperature sensing unit 11 mounted on, e.g., an outer surface of the housing 10. The ambient temperature sensing unit 11 is electrically connected to the control module 14, and is configured to sense an ambient temperature around the cooking device 1 and to transmit the ambient temperature to the control module 14. The control module 14 is further configured to adjust the operating condition and/or the operation time duration of the operation of the cooking unit 12 to heat the contents in the cooking room 101 based on the ambient temperature. For example, when the ambient temperature is relatively high so the surface temperature of the ingredients 4 in the cooking room 101 sensed by the temperature sensing unit 19 may increase easily, the control module 14 decreases the heating power level or the operating time duration of operation of the cooking unit 12. On the other hand, when the ambient temperature is relatively low so the surface temperature of the ingredients 4 in the cooking room 101 sensed by the temperature sensing unit 19 may not increase easily, the control module 14 increases the heating power level or the operating time duration of the cooking unit 12.

In one embodiment, the control module 14 further controls the display unit 17 to display the operation mode, the operating condition, and the operation time duration (or the remaining operation time) of the operation of the cooking unit 12 as the cooking unit 12 heats the contents in the cooking room 101.

The information about the ingredients 4 obtained from the barcode 31 further includes traceability information for each of the ingredients 4, such as a source (a place of origin) of the ingredient 4, a shipping history of the ingredients 4, a processing/producing method by which the ingredients 4 were obtained, an expiration date of the ingredients 4, and a preservation manner for the ingredients 4. Such information may also be displayed on the display unit 17 as controlled by the control module 14.

Figure 3:
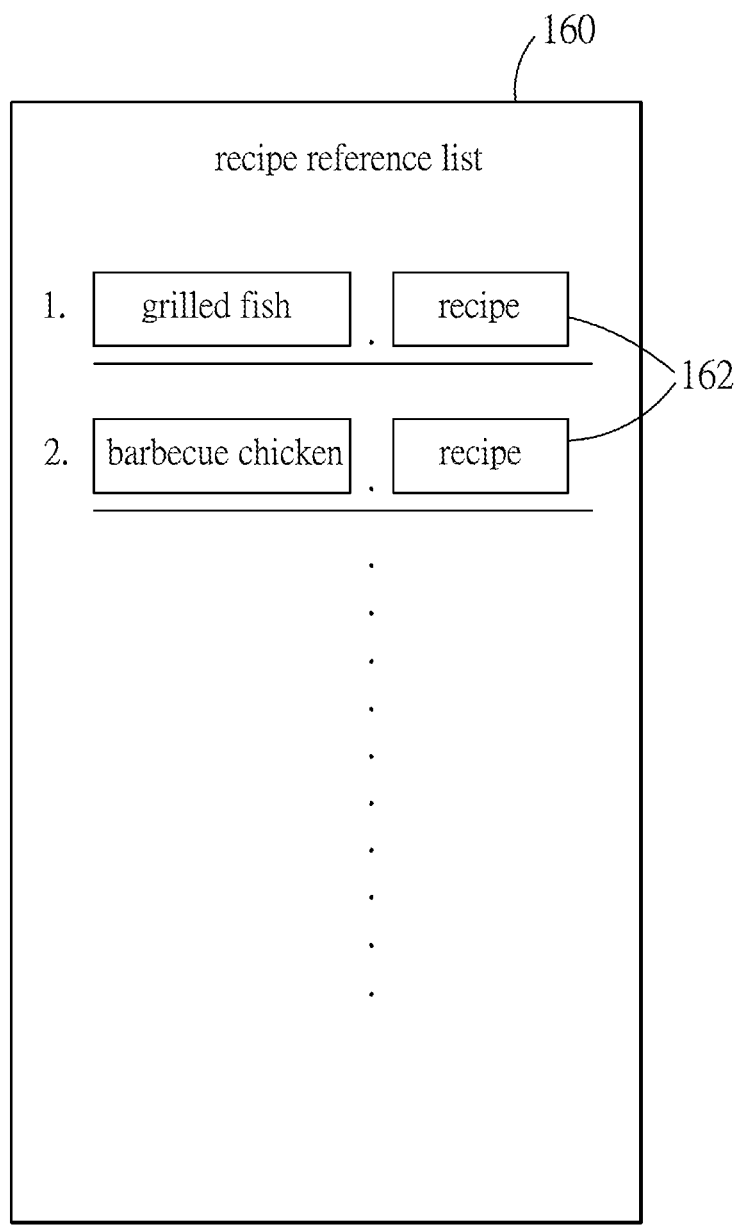
FIG. 3 is a schematic diagram illustrating a recipe reference list stored in a storage unit of the cooking apparatus according to one embodiment of the present disclosure.

Referring to FIG. 3, in one embodiment, the storage unit 16 further stores a recipe reference list 160 including a plurality of recipes 162. Each of the recipes 162 corresponds to a dish, e.g., grilled fish or barbecue chicken, and describes, without limitation, ingredients of the dish, a predetermined location where the ingredients of the dish is supposed to be placed in the cooking room 101, a predetermined total weight of the ingredients of the dish, and the traceability information for each ingredient of the dish. In this embodiment, the information included in the data represented by the barcode 31 on the package 3 is a recipe index of a dish. The control module 14 obtains the recipe index contained in the data received from the barcode reader 2, identifies one of the recipes 162 based on the recipe index, and controls the operation of the cooking unit 12 according to the identified one of the recipes 162.

Additionally, in one embodiment, the cooking device 1 further includes a communication module 140 (see FIG. 2). The communication module 140 is electrically connected to the control module 14 and is configured to communicate with a remote server 5 via a network, e.g., the Internet, to receive an updated file for the recipe reference list 160. The control module 14 is further configured to update the recipe reference list 160 using the updated file received from the remote server 5.

To sum up, in the present disclosure, with the information about the ingredients 4 to be cooked is included in the barcode 31 or stored in the storage unit 16, a user can operate the barcode reader 2 to read and decode the barcode 31 to thereby automatically activate and control operation of the cooking unit 12 as controlled by the control module 14 according to the cooking program based on the information about the ingredients. Further, the control module 14 is capable of automatically adjusting the operating condition and/or the operation time duration of the cooking unit 12 based on, e.g., the regional temperatures inside the cooking room 101, the degree of degradation of the cooking unit 12, the ambient temperature, or a combination thereof to ensure that the contents in the cooking room 101 are cooked properly.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A cooking apparatus configured to cook ingredients packaged together in a package that is provided with a barcode, the barcode representing data related to information about the ingredients, said cooking apparatus comprising:

a cooking device including a housing defining a cooking room for accommodating the ingredients therein, a cooking unit configured to heat contents in said cooking room, and a control module electrically connected to said cooking unit for controlling operation of said cooking unit;

a barcode reader electrically connected to said control module, and configured to scan the barcode on the package, to decode the barcode so as to obtain the data represented by the barcode, and to transmit the data to said control module, wherein said control module controls operation of said cooking unit based on the information contained in the data received from said barcode reader; and an image capturing module electrically connected to said control module and configured to capture an image inside said cooking room and to transmit the image to said control module, wherein said control module is further configured to:
analyze the image received from said image capturing module to determine whether said cooking room has placed therein the ingredients that correspond to the information;

activate and control operation of said cooking unit to heat the contents in said cooking room when it is determined that said cooking room has the ingredients placed therein;

analyze the image received from said image capturing module to further determine whether the ingredients are placed at a predetermined location in said cooking room when it is determined that said cooking room has the ingredients placed therein; and activate and control operation of said cooking unit to heat the contents in said cooking room when it is determined that the ingredients are placed at the predetermined location;

wherein said cooking device further includes a display and a weighing unit that are both electrically connected to said control module, said weighing unit being mounted at a bottom of said housing and configured to weigh the contents in said cooking room and to transmit a weight of the contents to said control module, wherein said control module is further configured to determine whether the weight of the contents in said cooking room conforms with a predetermined total weight of the ingredients corresponding to the information, to control said display to display a result of the determination, and to activate and control operation of said cooking unit when it is determined that said cooking room has the ingredients placed at the predetermined location and that the weight of the contents in said cooking room is equal to the predetermined total weight.

2. The cooking apparatus as claimed in claim 1, wherein said cooking device further includes a storage unit storing a plurality of reference image features that are related respectively to a plurality of ingredient items, said control module further configured to access said storage unit to acquire corresponding ones of the reference image features that are related respectively to the ingredients based on the information, and to determine whether said cooking room has the ingredients placed therein by analyzing the image from said image capturing module and determining whether the image has the corresponding ones of the reference image features.

3. The cooking apparatus as claimed in claim 2, wherein said storage unit further stores a recipe reference list including a plurality of recipes, each of the recipes corresponding to a dish and describing ingredients of the dish, a predetermined total weight of the ingredients, and a cooking program for cooking the dish, said control module further configured to obtain a recipe index as the information contained in the data received from said barcode reader, to identify one of the recipes based on the recipe index, and to control the operation of said cooking unit according to said one of the recipes.

4. The cooking apparatus as claimed in claim 3, wherein said cooking device further includes a communication module electrically connected to said control module and configured to communicate with a remote server via a network to receive an updated file for the recipe reference list, said control module further configured to update the recipe reference list using the updated file.

5. The cooking apparatus as claimed in claim 1, wherein said cooking device further includes a display and a weighing unit that are both electrically connected to said control module, said weighing unit being mounted at a bottom of said housing and configured to weigh the contents in said cooking room and to transmit a weight of the contents to said control module, wherein said control module is further configured to determine whether the weight of the contents in said cooking room conforms with a predetermined total weight of the ingredients corresponding to the information, to control said display to display a result of the determination, and to enable operation of said cooking unit when it is determined that said cooking room has the ingredients and that the weight of the contents in said cooking room is equal to the predetermined total weight.

6. The cooking apparatus as claimed in claim 1, wherein said cooking device further includes an ambient temperature sensing unit electrically connected to said control module, and configured to sense an ambient temperature around said cooking device and to transmit the ambient temperature to said control module, said control module further configured to adjust one or both of operating condition and an operation time duration of the operation of said cooking unit to heat the contents in said cooking room based on the ambient temperature.

7. A cooking apparatus configured to cook ingredients packaged together in a package that is provided with a barcode, the barcode representing data related to information about the ingredients, said cooking apparatus comprising:

a cooking device including a housing defining a cooking room for accommodating the ingredients therein, a cooking unit configured to heat contents in said cooking room, and a control module electrically connected to said cooking unit for controlling operation of said cooking unit; and a barcode reader electrically connected to said control module, and configured to scan the barcode on the package, to decode the barcode so as to obtain the data represented by the barcode, and to transmit the data to said control module, wherein said control module controls operation of said cooking unit based on the information contained in the data received from said barcode reader, wherein said cooking device further includes a temperature sensing unit electrically connected to said control module and disposed in said cooking room, said temperature sensing unit configured to sense an inside temperature in said cooking room and to transmit the inside temperature to said control module, said control module further configured to adjust one or both of operating condition and an operation time duration of the operation of said cooking unit to heat the contents in said cooking room based on the inside temperature, wherein said cooking unit is further configured to operate in a plurality of operation modes as controlled by said control module, said control module further configured to select and schedule at least two of the operation modes in which said cooking unit is to operate for heating the contents in said cooking room and to adjust one or both of the operating condition and the operation time duration for a current one of the at least two operation modes in which said cooking unit is operating based on the inside temperature that is currently sensed by said temperature sensing unit, wherein said temperature sensing unit is further configured to sense a plurality of regional temperatures corresponding respectively in position to a plurality of regions in said cooking room, and to transmit the regional temperatures to said control module, said control module further configured to compare the regional temperatures respectively with a plurality of predetermined temperatures and to determine whether to adjust the operating condition or the operation time duration for said cooking unit based on a result of the comparison between the regional temperatures and the predetermined temperatures.

8. The cooking apparatus as claimed in claim 7, wherein said cooking device further includes a storage unit storing a plurality of reference image features that are related respectively to a plurality of ingredient items, said control module further configured to access said storage unit to acquire corresponding ones of the reference image features that are related respectively to the ingredients based on the information, and to determine whether said cooking room has the ingredients placed therein by analyzing the image from said image capturing module and determining whether the image has the corresponding ones of the reference image features.

9. The cooking apparatus as claimed in claim 8, wherein said storage unit further stores a recipe reference list including a plurality of recipes, each of the recipes corresponding to a dish and describing ingredients of the dish, a predetermined total weight of the ingredients, and a cooking program for cooking the dish, said control module further configured to obtain a recipe index as the information contained in the data received from said barcode reader, to identify one of the recipes based on the recipe index, and to control the operation of said cooking unit according to said one of the recipes.

10. The cooking apparatus as claimed in claim 9, wherein said cooking device further includes a communication module electrically connected to said control module and configured to communicate with a remote server via a network to receive an updated file for the recipe reference list, said control module further configured to update the recipe reference list using the updated file.

11. The cooking apparatus as claimed in claim 7, wherein said cooking device further includes a display and a weighing unit that are both electrically connected to said control module, said weighing unit being mounted at a bottom of said housing and configured to weigh the contents in said cooking room and to transmit a weight of the contents to said control module,
wherein said control module is further configured to determine whether the weight of the contents in said cooking room conforms with a predetermined total weight of the ingredients corresponding to the information, to control said display to display a result of the determination, and to enable operation of said cooking unit when it is determined that said cooking room has the ingredients and that the weight of the contents in said cooking room is equal to the predetermined total weight.

12. The cooking apparatus as claimed in claim 7, wherein said cooking device further includes an ambient temperature sensing unit electrically connected to said control module, and configured to sense an ambient temperature around said cooking device and to transmit the ambient temperature to said control module, said control module further configured to adjust one or both of operating condition and an operation time duration of the operation of said cooking unit to heat the contents in said cooking room based on the ambient temperature.

13. A cooking apparatus, configured to cook ingredients packaged together in a package that is provided with a barcode, the barcode representing data related to information about the ingredients, said cooking apparatus comprising:
a cooking device including a housing defining a cooking room for accommodating the ingredients therein, a cooking unit configured to heat contents in said cooking room, and a control module electrically connected to said cooking unit for controlling operation of said cooking unit; and
a barcode reader electrically connected to said control module, and configured to scan the barcode on the package, to decode the barcode so as to obtain the data represented by the barcode, and to transmit the data to said control module, wherein said control module controls operation of said cooking unit based on the information contained in the data received from said barcode reader,
wherein said cooking device further includes a temperature sensing unit electrically connected to said control module and disposed in said cooking room, said temperature sensing unit configured to sense an inside temperature in said cooking room and to transmit the inside temperature to said control module, said control module further configured to adjust one or both of operating condition and an operation time duration of the operation of said cooking unit to heat the contents in said cooking room based on the inside temperature,
wherein said cooking unit is further configured to operate in a plurality of operation modes as controlled by said control module, said control module further configured to select and schedule at least two of the operation modes in which said cooking unit is to operate for heating the contents in said cooking room and to adjust one or both of the operating condition and the operation time duration for a current one of the at least two operation modes in which said cooking unit is operating based on the inside temperature that is currently sensed by said temperature sensing unit,
wherein said temperature sensing unit is further configured to sense a plurality of regional temperatures corresponding respectively in position to a plurality of regions in said cooking room, and to transmit the regional temperatures to said control module, said control module further configured to compare the regional temperatures respectively with a plurality of predetermined temperatures, to determine a degree of degradation of said cooking unit based on a result of the comparison between the regional temperatures and the predetermined temperatures, and to determine whether to adjust the operating condition or the operation time duration for said cooking unit based on the degree of degradation of said cooking unit.

14. A cooking apparatus configured to cook ingredients packaged together in a package that is provided with a barcode, the barcode representing data related to information about the ingredients, said cooking apparatus comprising:
a cooking device including a housing defining a cooking room for accommodating the ingredients therein, a cooking unit configured to heat contents in said cooking room, and a control module electrically connected to said cooking unit for controlling operation of said cooking unit; and
a barcode reader electrically connected to said control module, and configured to scan the barcode on the package, to decode the barcode so as to obtain the data represented by the barcode, and to transmit the data to said control module, wherein said control module controls operation of said cooking unit based on the information contained in the data received from said barcode reader,
wherein said control module is configured to determine a degree of degradation of said cooking unit by comparing an actual output power of said cooking unit with a predetermined output power of said cooking unit, and to determine whether to adjust operating condition or an operation time duration of the operation of said cooking unit to heat the contents in said cooking room based on the degree of degradation of said cooking unit.

15. The cooking apparatus as claimed in claim 14, wherein said cooking device further includes a storage unit storing a plurality of reference image features that are related respectively to a plurality of ingredient items, said control module further configured to access said storage unit to acquire corresponding ones of the reference image features that are related respectively to the ingredients based on the information, and to determine whether said cooking room has the ingredients placed therein by analyzing the image from said image capturing module and determining whether the image has the corresponding ones of the reference image features.

16. The cooking apparatus as claimed in claim 15, wherein said storage unit further stores a recipe reference list including a plurality of recipes, each of the recipes corresponding to a dish and describing ingredients of the dish, a predetermined total weight of the ingredients, and a cooking program for cooking the dish, said control module further configured to obtain a recipe index as the information contained in the data received from said barcode reader, to identify one of the recipes based on the recipe index, and to control the operation of said cooking unit according to said one of the recipes.

17. The cooking apparatus as claimed in claim 16, wherein said cooking device further includes a communication module electrically connected to said control module and configured to communicate with a remote server via a network to receive an updated file for the recipe reference list, said control module further configured to update the recipe reference list using the updated file.

18. The cooking apparatus as claimed in claim 14, wherein said cooking device further includes a display and a weighing unit that are both electrically connected to said control module, said weighing unit being mounted at a bottom of said housing and configured to weigh the contents in said cooking room and to transmit a weight of the contents to said control module, wherein said control module is further configured to determine whether the weight of the contents in said cooking room conforms with a predetermined total weight of the ingredients corresponding to the information, to control said display to display a result of the determination, and to enable operation of said cooking unit when it is determined that said cooking room has the ingredients and that the weight of the contents in said cooking room is equal to the predetermined total weight.

19. The cooking apparatus as claimed in claim 14, wherein said cooking device further includes an ambient temperature sensing unit electrically connected to said control module, and configured to sense an ambient temperature around said cooking device and to transmit the ambient temperature to said control module, said control module further configured to adjust one or both of operating condition and an operation time duration of the operation of said cooking unit to heat the contents in said cooking room based on the ambient temperature.

\* \* \* \* \*